Feb. 7, 1939.    M. WAGNER    2,146,319
PERMANENT MOLDING APPARATUS
Filed Aug. 3, 1937    3 Sheets-Sheet 1
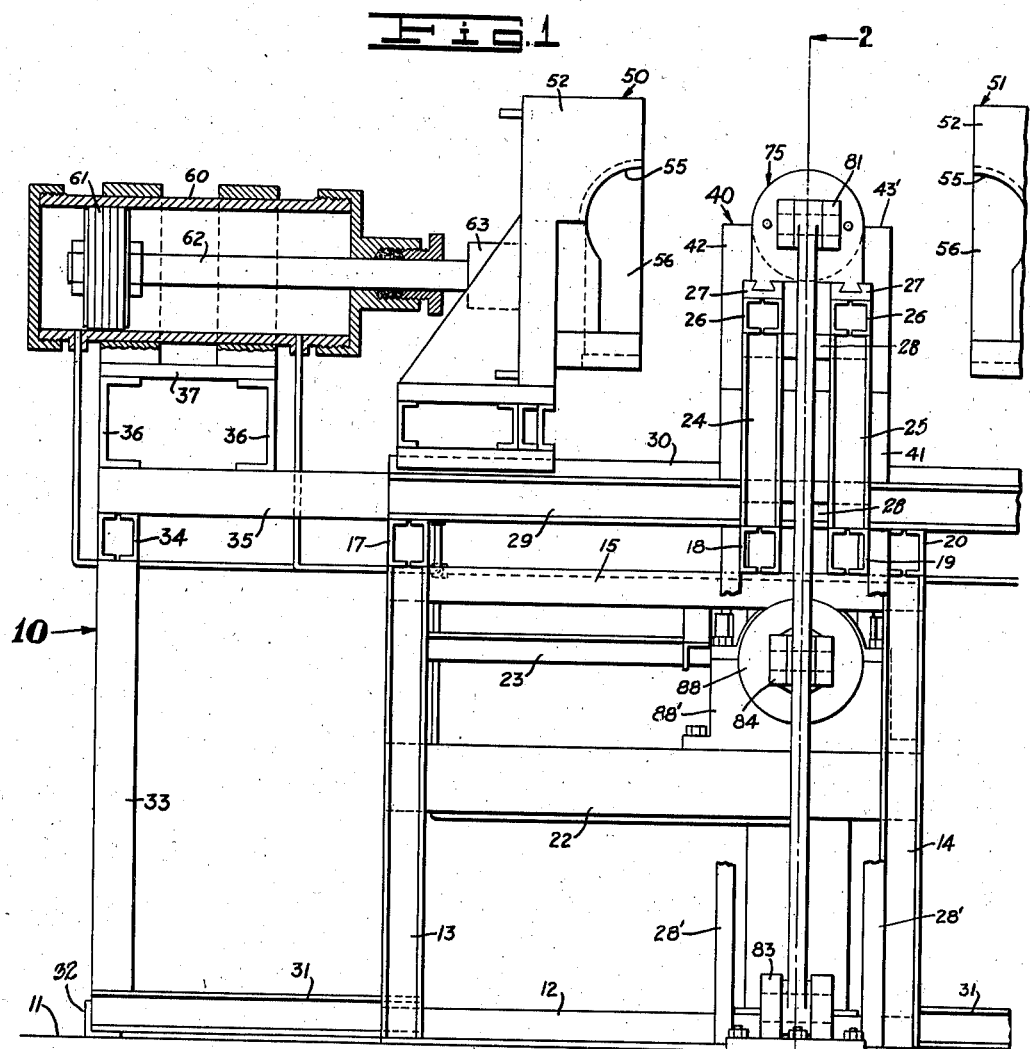
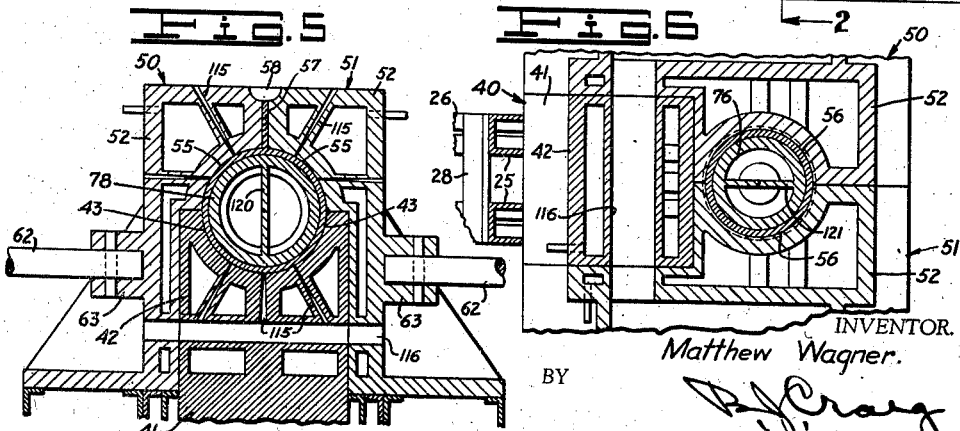
INVENTOR.
Matthew Wagner.
BY
ATTORNEY.

Feb. 7, 1939.  M. WAGNER  2,146,319
PERMANENT MOLDING APPARATUS
Filed Aug. 3, 1937  3 Sheets-Sheet 2
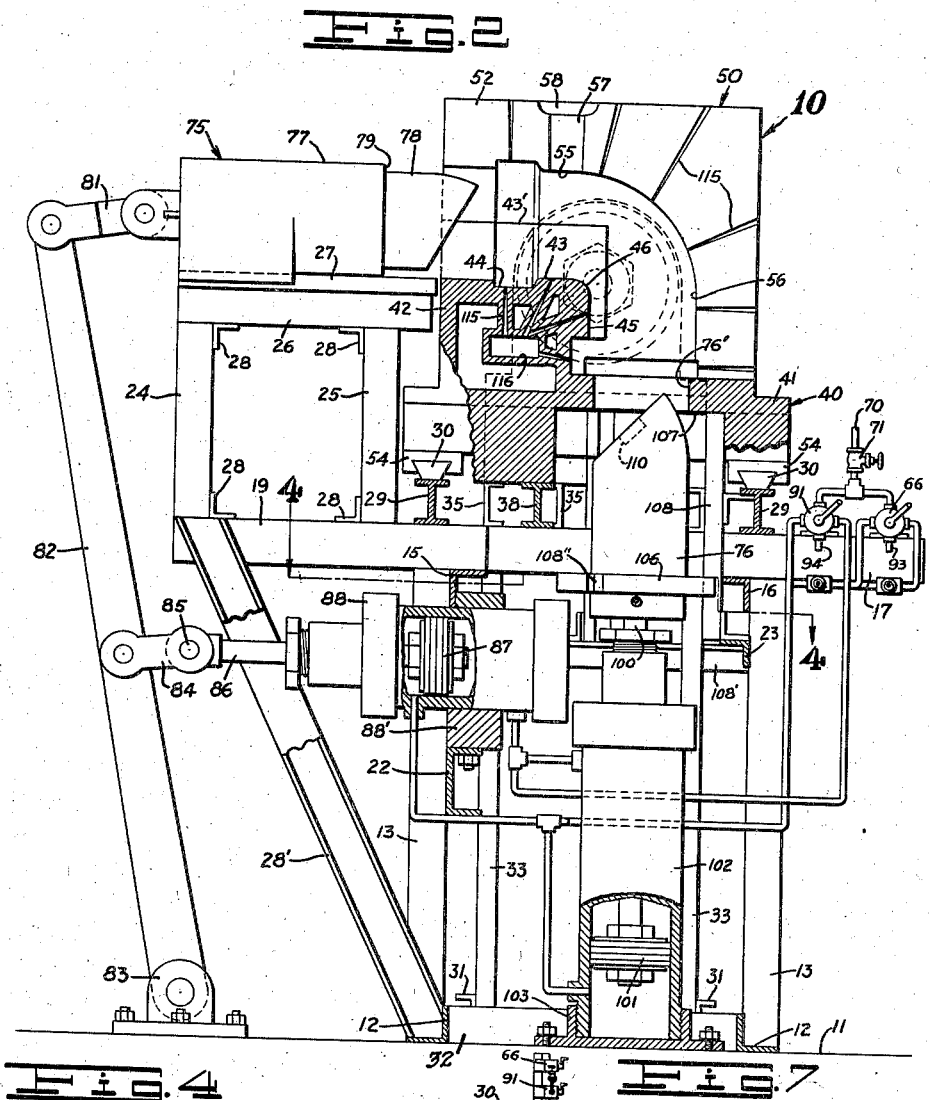
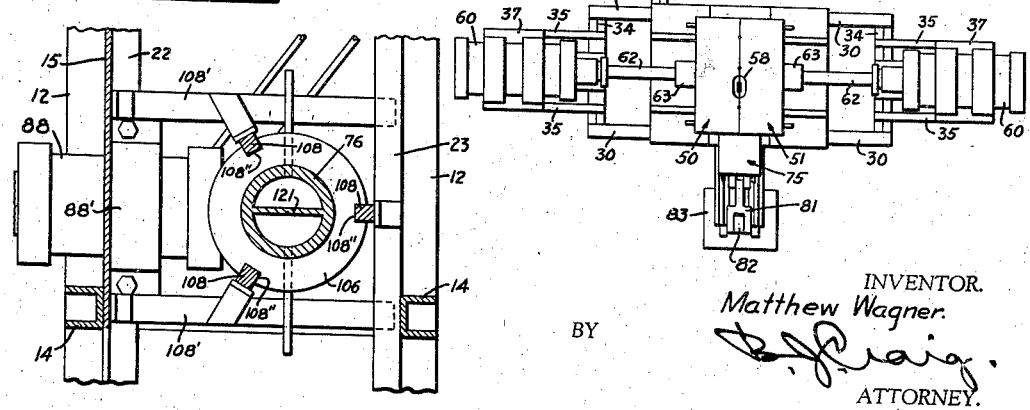
INVENTOR.
Matthew Wagner.
BY
ATTORNEY.

Feb. 7, 1939.  M. WAGNER  2,146,319
PERMANENT MOLDING APPARATUS
Filed Aug. 3, 1937   3 Sheets-Sheet 3
Fig. 3
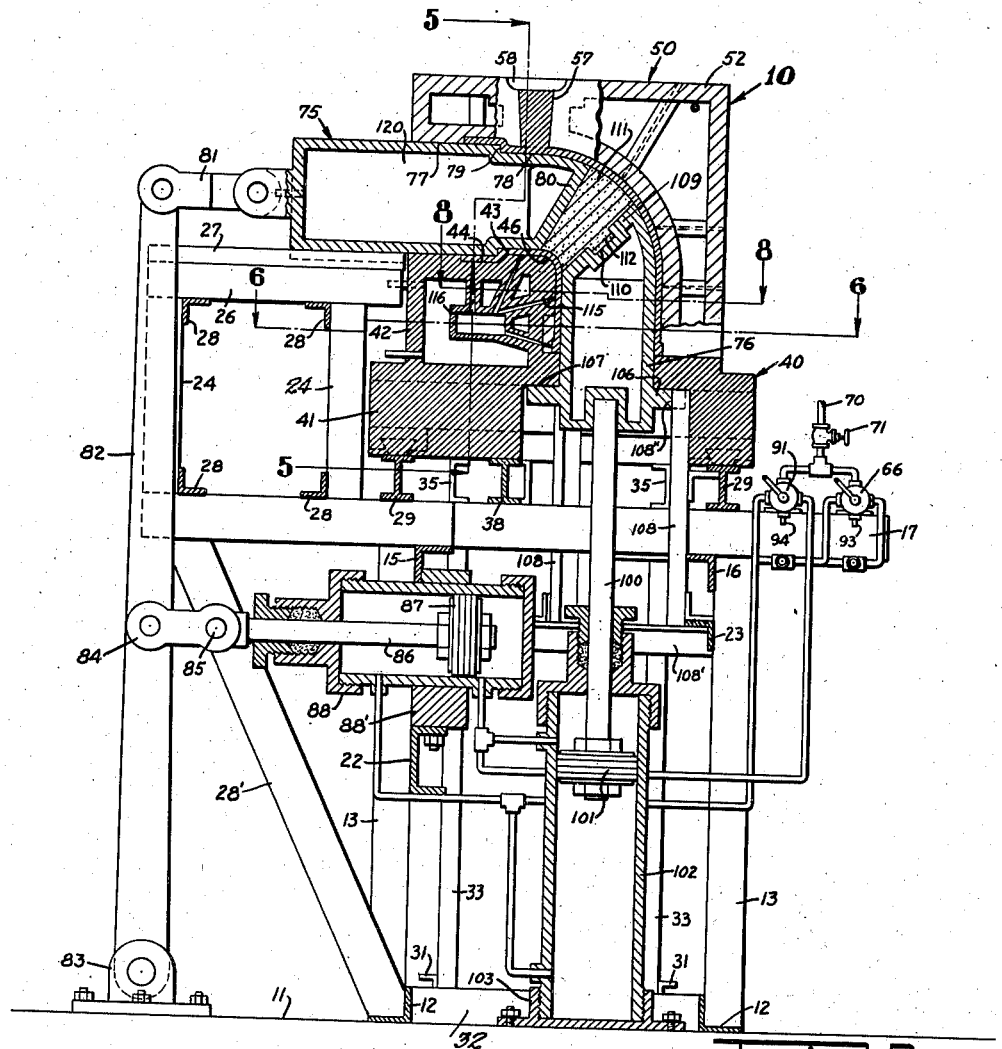
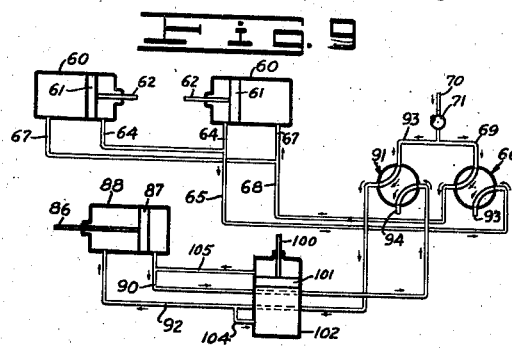
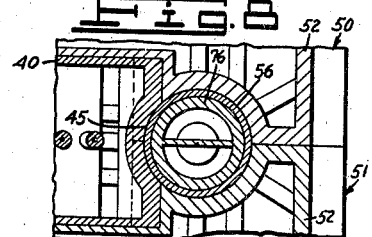
INVENTOR.
Matthew Wagner.
BY
ATTORNEY.

Patented Feb. 7, 1939

2,146,319

UNITED STATES PATENT OFFICE 2,146,319

PERMANENT MOLDING APPARATUS

Matthew Wagner, Glendale, Calif.

Application August 3, 1937, Serial No. 157,119

4 Claims. (Cl. 22—93)

This invention relates to permanent molding apparatus.

The general object of the invention is to provide a permanent mold which is particularly adapted for use in the manufacture of hollow cast iron articles.

A more specific object of the invention is to provide an improved permanent molding apparatus which includes novel means for moving the core members.

Another object of the invention is to provide novel mold members for use in a permanent mold.

An additional object of the invention is to provide a novel mounting for the members of a permanent mold.

A further object of the invention is to provide a permanent mold member including cores which are of a permanent nature and wherein a sand core cooperates with movable core members in the manufacture of the finished articles.

Other objects and the advantages of my invention will be apparent from the following description taken in connection with the accompanying drawings, wherein:

Fig. 1 is a side elevation partly in section showing my improved permanent molding apparatus;

Fig. 2 is a section taken on line 2—2 Fig. 1 showing the core members in elevation and portions of the base member broken away;

Fig. 3 is a section similar to Fig. 2 showing the device in a closed position;

Fig. 4 is a fragmentary section taken on line 4—4 Fig. 2;

Fig. 5 is a fragmentary section taken on line 5—5 Fig. 3;

Fig. 6 is a fragmentary section taken on line 6—6 Fig. 3;

Fig. 7 is a top plan view of the mold apparatus on a reduced scale;

Fig. 8 is a section taken on line 8—8 Fig. 3; and

Fig. 9 is a diagrammatic view showing the operating control.

Referring to the drawings by reference characters I have shown my invention as embodied in a permanent molding apparatus which is indicated generally at 10. As shown this apparatus is mounted on a base 11 upon which angle members comprising a base frame 12 are mounted.

Mounted upon the base frame member 12 I show two pairs of vertically extending standards designated at 13 and 14. The upper end of one of the standards 13 is connected by an angle 15 with the upper end of one of the standards 14 while the upper ends of the other standards 13 and 14 are connected by an angle 16. Mounted on and extending transversely to the angle members 15 and 16 I show four pairs of opposed channel members 17, 18, 19 and 20.

One set of the standards 13 and 14 is connected by a cylinder bracket supporting channel member 22 and the opposite set of standards 13 and 14 are connected by an angle member 23. The channel member 18 has inner and outer vertical leg members 24 thereon which extend upwardly therefrom. The channel member 19 has similar inner and outer leg members 25 thereon. Mounted on each of the sets of legs 24 and 25 I provide channel members 26 on each of which I provide a dovetailed rail member 27. Furthermore the legs 24 and 25 are connected by angle members 28 and suitable brace members 28' are provided which extend from the base frame 12 to adjacent the outer ends of the channel members 18 and 19.

Transversely mounted on the channels 17 and 20 I provide a pair of spaced I beams 29 each of which has a dovetailed rail member 30 thereon.

Extending outward from the base 12 at each end thereof I provide a pair of spaced channel members 31 which at their inner ends are secured to the base 12 and at their outer ends are connected by a transverse angle 32. The channel members 31 have vertical legs 33 thereon which are connected at the top by a pair of transverse channel members 34. Mounted on the channels 34 I provide a pair of spaced members 35 which are secured to the channel members 17 intermediate the I beams 29. Mounted on the members 35 I provide a pair of transverse channels 36 having a cylinder supporting bracket 37 thereon.

Mounted upon the I beams 29 and on another I beam 38 I show an intermediate mold member which is indicated generally at 40. This mold member is sectioned in Figs. 2 and 3 to more clearly show its relation to the other parts of my apparatus. This intermediate mold member comprises a lower portion 41 from which an upwardly extending portion 42 projects. In the present application I have shown my invention as used to manufacture soil pipe elbows and according to the apparatus shown the intermediate member is provided with a semi-cylindrical recess 43 in its upper surface which is located at the middle of the intermediate member so that a shoulder 43' is provided at each side of the recess 43. This recess is provided with a shoulder 44 and enlarged end whereby the bell on the pipe is formed. The intermediate member 40 further includes a semi-cylindrical recess 45 which is arranged at right angles to the semi-cylindrical recess 43 (see Fig. 8). The recesses 43 and 45 are joined by a curved portion 46 as shown in Figs. 2 and 3. The semi-cylindrical recess 46 and the other portions of the elbow are formed by mold members to be presently described.

The intermediate mold member with its upwardly directed semi-cylindrical portion acts as a cradle or support for the freshly cast elbow and serves to support this elbow until it has chilled sufficiently to retain its shape.

At each side of the intermediate mold member 40 I show a pair of end mold members 50 and 51. These mold members are alike and a description of one will suffice for both. Each of the mold members 50 and 51 comprises a body 52 which is provided with recessed dovetail members 54 which engage the dovetail rail members 30 previously described.

The mold members 50 and 51 are so disposed that they may be moved towards and from the intermediate mold member 40. The mold members 50 and 51 are each provided with a recess 55 which includes 90° and which is horizontally disposed and which merges into a vertically disposed semi-cylindrical recess 56 so that the portion of the elbow which extends vertically is produced. The mold members 50 and 51 include opposed pouring spouts 57 which terminate at their upper ends in pouring bases 58 through which the metal may be poured into the mold.

In order to move the mold members 50 and 51 I provide a cylinder 60 in each of the cylinder supporting brackets 37 previously mentioned. Each of the cylinders 60 is provided with piston 61 and piston rod 62 the piston rod being connected to a boss 63 on the mold members 50 and 51 (see Fig. 1).

One end of each cylinder 60 is connected by a pipe 64 with a pipe 65 which in turn is connected to a four way valve 66 (see Fig. 9). The other ends of the cylinders 60 are connected by pipes 67 with a pipe 68 which is connected to the four way valve 66. The valve 66 is connected by a conduit 69 with a source of fluid supply 70 which is controlled by a valve 71.

The construction is such that when the valve 66 is in the position shown in Fig. 9 fluid will be supplied to the outer ends of the cylinders thus causing the pistons to move inwardly thus moving the movable mold members 50 and 51 towards the fixed mold member 40. When the valve 66 is turned to 90° fluid flows through the pipe 64 to the other end of the cylinders thus moving the mold members 50 and 51 towards the fixed mold member 40.

Forming a part of my invention I provide core members 75 and 76. The core member 57 moves in the upper horizontally disposed portion of the mold and is mounted on the dovetail rail members 27 previously described while the core member 76 moves into the vertical lower portion of the mold cavity through an aperture 76' in the base 41 of the fixed mold member 40. The mold member 75 comprises a hollow body and a cylindrical outer portion 77 and a cylindrical inner portion 78 and includes a shoulder 79 which serves to form the bell in of the pipe. The inner end of the core is closed by a plane plate or end member 80. In order to move the core member 75 I connect this core member by means of a link 81 with a lever 82 which is pivoted as at 83. The lever 82 is adapted to be rocked by a link 84 which is pivoted as at 85 to a piston rod 86 on a piston 87 mounted in a cylinder 88 which is mounted in a cylinder bracket 88' on the cylindrical bracket support channel 22 previously mentioned.

The cylinder 88 is connected by a pipe 90 with a four way valve 91 and is also connected at the other end of the cylinder by a pipe 92 with the four way valve 91. The construction is such that when the four way valve is in the position shown in Fig. 9 fluid which is supplied by a pipe 93 connected to the four way valve will pass through the valve to the pipe 92 thence to the cylinder 88 and will move the cylinder thus rocking the lever 82 and moving the core member 75 to its inner position. When the valve member 91 is turned to 90° fluid will pass through the pipe 90 to the other end of the cylinder thus rocking the lever and causing the core member to move out of the mold cavity. It might be mentioned that each of the valves 66 and 91 is provided with suitable vents 93 and 94 to the atmosphere.

The core member 76 is connected to the end of a piston rod 100 which is connected to a piston 101 mounted in a cylinder 102 supported on a base 103. One end of the cylinder 102 is connected by a pipe 104 with the pipe 92 and the other end of the cylinder 102 is connected by a pipe 105 with a pipe 90 and from the foregoing description it will be apparent that when the valve 91 is operated the piston 101 will be reciprocated thus moving the core member 76 in and out of the mold cavity. In order to limit the upward movement of the core member 76 I provide this member with an external flange 106 which engages a shoulder 107 at the end of the cavity in the fixed mold member previously described. For guiding the core member 76 I provide a plurality of vertical guide bars 108 which are supported on an angle iron frame work 108' and are positioned in recesses 108'' in the core flange 106 (see Fig. 4).

The core member 76 like the core member 75 is hollow and is provided with an end face 109 which is provided with a recess 110. When the core members 75 and 76 are in their inner position they are spaced apart as shown in Fig. 3 to provide a chamber in which a sand core 111 is disposed. This sand core is made with a projection 112 which enters the recess 110 to prevent accidental slipping of the core member 111 while the mold is being prepared for pouring.

The mold members are provided with suitable gas vent holes 115. These holes preferably have small inner ends and broaden as they extend outwardly. Certain of these holes in the fixed mold member pass through a conduit 116 while the other members pass to the atmosphere as shown in the drawings.

In order to provide circulation for cooling the mold members and cores I provide these members with cavities through which cooling fluid such as oil is suitably pumped. The core members 75 and 76 are provided with longitudinally extending partitions 120 and 121 which extend from the outer ends to adjacent the inner closures.

In the use of my apparatus the sand core 111 is mounted in place with the boss thereon engaging the groove in the core 76 and the parts are moved to the position shown in Fig. 3. The metal is then poured and very quickly after the pouring operation the cores are withdrawn and the mold members 50 and 51 are separated thus leaving the freshly made casting resting on the intermediate mold member. This mold member serves to hold the casting until it has slightly further cooled when it is removed and the operation is repeated.

From the foregoing description it will be apparent that I have invented a novel permanent molding apparatus which can be economically manufactured and which is highly efficient in use.

Having thus described my invention, I claim:

1. In a permanent molding apparatus, a support, a fixed intermediate mold member and a pair of movable mold members mounted on said support, means to move said movable mold members towards and from the fixed mold member, said mold members having complemental recesses which together form an open ended cavity which is substantially circular in cross section, the axis of said cavity being substantially elbow shaped, a core member slidable on said support and adapted to enter one end of said mold cavity, a second core member slidably mounted on said support to move at an angle to the movement of the other core member, said second core member being adapted to enter the other end of said mold cavity, said core members each having an end wall, the end walls being spaced apart when the core members are in pouring position, a sand core disposed between said walls, said mold members having a pouring basin therein, hydraulic means to move said core members, hydraulic means to move said slidable mold members and means to cause actuation of said hydraulic means.

2. In a permanent molding apparatus, a support, a fixed mold member mounted on said support, slides on said support, movable mold members mounted on said slides, said mold members having recesses therein, said recesses coacting to form a mold cavity, said mold cavity including a horizontally disposed portion and a vertically disposed portion, a cylinder member mounted on said support, a piston in said cylinder, a rod on said piston, a core member mounted on said rod and movable into the vertically extending portion of said cavity, said core member having an end wall, a second core member mounted on said frame to slide into and out of the horizontal portion of said mold cavity, a lever pivoted to said second core member and to said support, a second cylinder, a piston in said second cylinder, a rod on said second piston, a link connecting said second rod and lever whereby the second core member is moved, a pair of cylinders each having a piston therein connected to one of said movable mold members and means for operating said pistons.

3. In a permanent molding apparatus, a support, a fixed mold member mounted on said support, slides on said support, movable mold members mounted on said slides, said mold members having recesses therein, said recesses coacting to form a mold cavity, said mold cavity including a horizontally disposed portion and a vertically disposed portion, a cylinder member mounted on said support, a piston in said cylinder, a rod on said piston, a core member mounted on said rod and movable into the vertically extending portion of said cavity, said core member having an oblique end wall, a second core member mounted on said frame to slide into and out of the horizontal portion of said mold cavity, a lever pivoted to said second core member and to said support, a second cylinder, a piston in said second cylinder, a rod on said second piston, a link connecting said second rod and lever whereby the second core member is moved, a piston means connected to said movable mold members, means for operating said pistons, said second core member having an oblique end wall, said oblique end walls being spaced apart when the core members are in their inner position and a removable core disposed between said oblique end walls.

4. In a permanent molding apparatus, a support, a fixed mold member mounted on said support, slides on said support, movable mold members mounted on said slides, said mold members having recesses therein, said recesses coacting to form a mold cavity, said mold cavity including a horizontally disposed portion and a vertically disposed portion, a cylinder member mounted on said support, a piston in said cylinder, a rod on said piston, a core member mounted on said rod and movable into the vertically disposed portion of said cavity, said core member having an oblique end wall with a recess therein, a second core member mounted on said frame to slide into and out of the horizontal portion of said mold cavity, a lever pivoted to said second core member and to said support, a second cylinder, a piston in said second cylinder, a rod on said second piston, a link connecting said second rod and lever whereby the second core member is moved, a pair of cylinders each having a piston therein connected to one of said movable mold members, means for operating said pistons, said second core member having an oblique end wall, said oblique end walls being spaced apart when the core members are in their inner position and a removable sand core having a lug thereon fitting said oblique end wall recess and disposed between said oblique end walls.

MATTHEW WAGNER.